3,769,230
CALCIUM FLUORIDE-RARE EARTH FLUORIDE
FLUORESCENT COMPOUND USEFUL AS A
LASER CRYSTAL
Morton Robinson, Malibu, and Donald P. Devor, Santa
Monica, Calif., assignors to Hughes Aircraft Company,
Culver City, Calif.
Continuation-in-part of abandoned application Ser. No.
847,082, Aug. 4, 1969. This application Apr. 28, 1972,
Ser. No. 248,511
Int. Cl. C09k 1/06
U.S. Cl. 252—301.4 H                  3 Claims

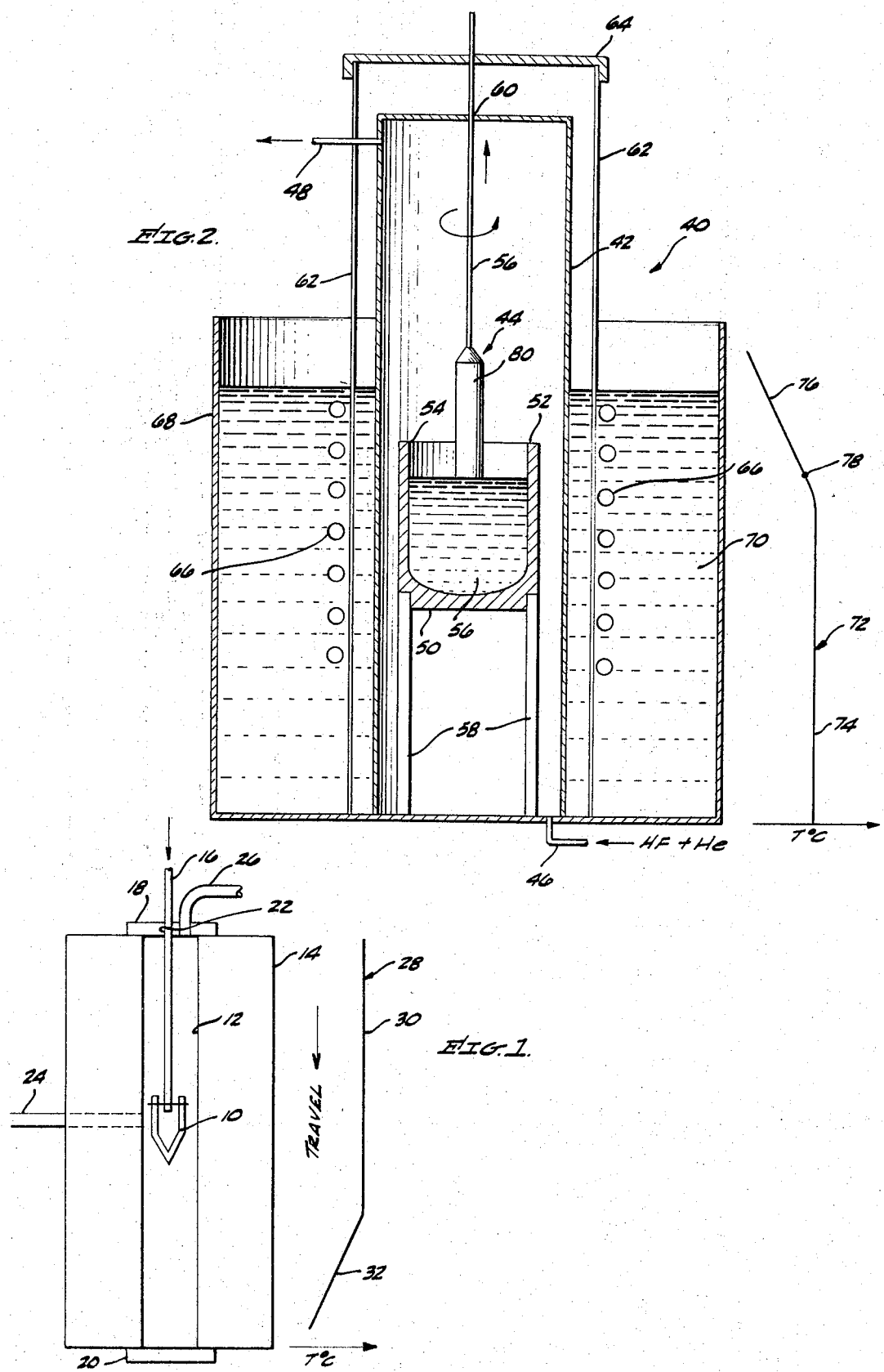

ABSTRACT OF THE DISCLOSURE

A fluorescent compound includes ions of calcium, erbium, and fluorine. The erbium and calcium ions are present in this compound in the exact ratio of 5:2. This new compound has the chemical formula $Ca_2Sr_5F_{19}$. It serves as a laser material when activated with holmium ions substituting for erbium ions and additionally sensitized with thulium ions for erbium ions. The compound may also be further sensitized with ytterbium ions substituting for erbium ions, if desired. Holmium, thulium, and ytterbium concentrations range respectively from 1–10 percent, 1–10 percent, and 0–10 percent of the erbium ions in the $Ca_2Er_5F_{19}$ compound. Experimental evidence indicates that sensitization of fluorescence occurs through an interaction among two or more of the rare earth ions.

---

Figure 3A:
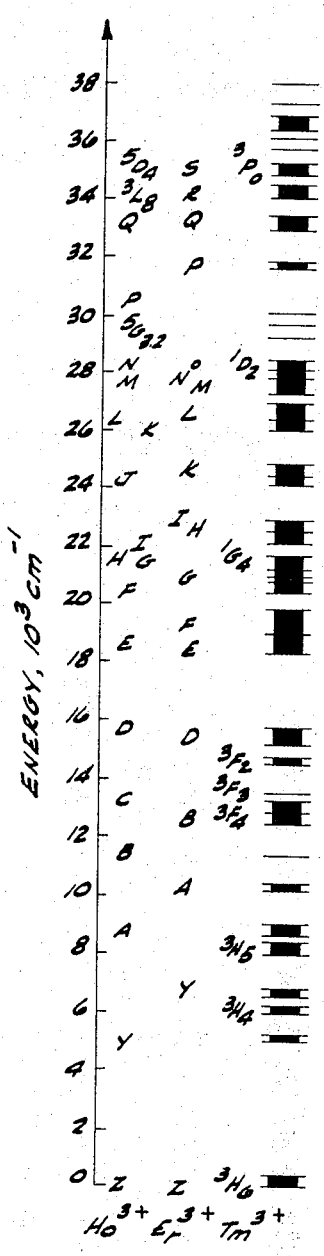

This application is a continuation-in-part of copending application, Ser. No. 847,082, filed Aug. 4, 1969, now abandoned, entitled "Calcium Fluoride Rare Earth Fuoride Fuorescent Compound Useful as a Laser Crystal."

The present invention relates to a fluorescent compound of calcium-erbium fluoride having the formula $Ca_2Er_5F_{19}$ sensitized with ions of thulium and, if desired, ytterbium, and activated with ions of holmium. Experimental evidence indicates that sensitization of fluorescene occurs through an interaction among two or more of the rare earth ions.

As distinguished from prior art materials, the present invention comprises a fluorescent compound whose formula is $Ca_2Er_5F_{19}$. When activator holmium ions and sensitizer thulium ions and, if desired, ytterbium ions, are substituted for erbium ions, the inventive compound is further different from such prior art materials in that the erbium ions of the $Ca_2Er_5F_{19}$ compound are a stoichiometric constituent thereof and sensitizes the holmium activator ions from which laser emission is obtained. In those prior art materials, erbium ions sensitizers and holmium ion activators both were added to optically passive host materials, such as glass, $CaF_2$ and $Y_3Al_5O_{12}$, which originally contained no rare earth ions. When doped with rare earth activators and sensitizers for laser applications, such prior art optically passive materials have contained up to $5 \times 10^{21}$ cu.$^{-3}$ rare earth ions; therefore, the activator and sensitizer rare earth ions are diluted by the optically passive ions by substitution of the latter by the formed ions. In the present invention, in contrast to these prior art materials, the $Ca_2Er_5F_{19}$ compound contains a constant total concentration of $1.6 \times 10^{22}$ cm.$^{-3}$ rare earth ions since holmium, thulium and ytterbium ions replace erbium ions in the compound which, in its pure form, already contains $1.6 \times 10^{22}$ cm.$^{-3}$ erbium ions. Furthermore, in such dilute crystals of the prior art, each rare earth ion has its own system of energy levels and fluorescence is largely dependent upon the individual level or levels of the interacting ions through a serial process of precisely resonant transitions thereof. Therefore, fluorescence and laser emission can be attributed only to a particular energy level of a rare earth ion, aided by such as phenomenon as cross-relaxation. In addition, the efficiency of sensitization of such prior crystals has been small.

In the present invention, the fluorescence obtained is not accountable only to the individual energy levels of the ion because of the fluorescence excitation occurring at photon energies other than the assigned energy levels of the individual ions. Thus, it is believed that the energy levels of two or more rare earth ions interact to provide a new energy level, hereinafter termed a "pair-level." The particular fluorescent crystalline compound encompassed by the present invention includes pair-level combinations of ions of erbium, holmium, thulium, and/or ytterbium in calcium fluoride. The effciency of sensitization is very high, up to measured quantum yields of over 500 percent. Furthermore, the high quantum yield of the crystals of the compound is specifically new and uniquely characteristic of the material.

Synthesization of the compounds may be obtained by many methods among which are Stockbarger, Czochralski, Bridgman, Strober, and/or combinations thereof. Specifically, the compound results from the chemical reaction of two moles of calcium fluoride with five moles of erbium fluoride expressed as $Ca_2Er_5F_{19}$ or $2CaF_2:5ErF_3$. In the fluorescent composition, erbium ions are substituted by holmium ions and, if desired, thulium ions and ytterbium ions.

All methods use powdered starting materials of high purity rare earth and alkaline earth fluorides having a mimium purity of 99.999 percent.

As an example, in the Stockbarger method, the starting materials are mixed in proper proportions to obtain the desired single crystal product and loaded into a crucible which is formed with an open end and which is preferably made of graphite. The crucible and the polycrystalline starting material are attached to a lowering rod in a high temperature furnace and the temperature is slowly raised in an ambient atmosphere of pure helium to approximately 50 degrees C. above the melting point of the compound to reduce the viscosity of the melt and to eliminate bubbles therein. A flow of hydrogen fluoride is initiated and dispersed throughout the interior of the furnace and is continued for a few hours while the crucible remains stationary and the temperature remains at 50 degrees C. above the compound material's melting point. The crucible is then lowered at a rate commensurate with the growth rate of the crystal. At the end of the growth travel region, crystal annealing takes place. The time required for satisfactory annealing depends on the crystal material and the crucible material as well as the length and diameter of the crystal. The crystal is slowly cooled to a specified temperature, the hydrogen fluoride flow is halted, and the furnace is cooled to room temperature over a period of approximately 24 hours.

Any suitable furnace may be used for crystal growth; however, the furnace is so constructed and arranged as to give a preferred temperature gradient.

It is, therefore, an object of the present invention to provide a new calcium fluoride-rare earth fluoride fluorescent compound.

Another object is the provision of such a fluorescent compound heavily concentrated with the rare earths.

Another object is to provide such a fluorescent compound wherein sensitization occurs as a result of the interactions of two or more rare earth ions.

Another object is the provision of such a fluorescent compound resulting from the method by which the composition is synthesized.

Another object is to provide such a fluorescent compound having a quantum yield greater than unity.

Figure 3B:
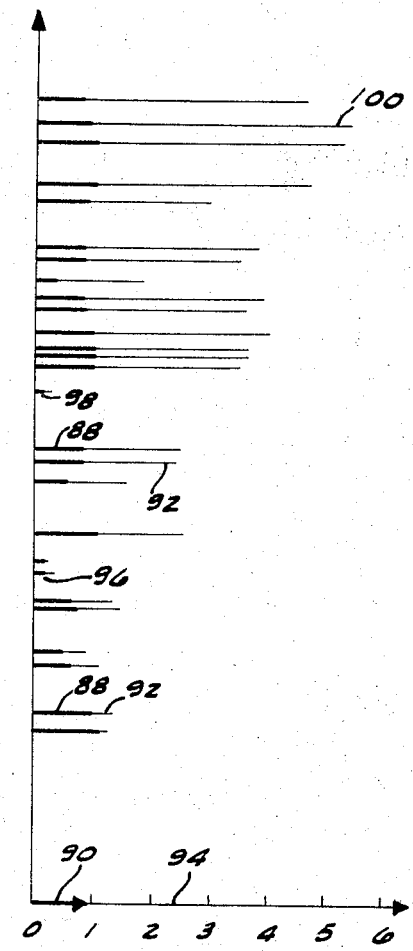

Other aims and objects, as well as a more complete understanding of the present invention, will appear from the following explanation of exemplary embodiments and the accompanying drawings thereof, in which:

FIGS. 1 and 2 are schematic representations of high temperature furnaces used for crystal growth respectively by a Bridgman process and by a Czochralski process wherein the temperature gradients of the furnaces are depicted alongside the furnaces; and FIGS. 3A and 3B graphically represent respectively the energy levels of one illustrative fluorescent composition of matter of the formula $Ca_2Ho_{0.05}Er_{4.90}Tm_{0.05}F_{19}$ and 77 degrees K. quantum yields of trivalent holmium ion fluorescence versus excitation wave number.

To produce the compounds of the present invention, rare earth and alkaline earth fluorides, having a minimum purity of 99.999 percent, are mixed to provide the desired single crystal. The mixture is first fused in a large crucible in the presence of a small partial pressure of hydrogen fluoride and helium to eliminate slight traces of any rare earth oxyfluorides. This fusion step can be carried out in the equipment depicted in the FIG. 1 Bridgman furnace which is also used for the growth of the ultimate crystal. The fused polycrystalline starting material is placed within a crystal-growing crucible and the two are then placed within the interior 12 of a furnace 14 and held therein at the end of a rod 16. Preferably, both the rod and the crucible are formed from graphite. A pair of plates 18 and 20 are secured at both ends of furnace 14 to enclose and seal interior 12. An inlet 22 is provided in plate 18 for reception of rod 16 and to permit movement thereof. A gas inlet 24 communicates with interior 12 and an outlet 26 is formed in another opening in plate 18. The furnace utilizes heating elements to provide a temperature curve and gradients as depicted by curve 28. Curve 28 represents the temperature profile of the furnace having a maximum temperature portion 30 and lower portion 32. Maximum temperature portion 30 is at least 50 degrees C. above the melting point of any of the laser crystals while lower portion 32 includes all crystallization temperatures at which the various laser crystals will solidify. Lower portion 32 has a preferred gradient of 50 degrees C. per inch.

After the fused polycrystalline starting material has been loaded into crucible 10, rod 16 has been secured thereto, and the crucible and starting material have been placed and sealed within the interior of furnace 14, an ambient atmosphere of pure helium is provided within the furnace interior through inlet 24. The helium continues to flow and the temperature of the furnace is slowly raised to above (for example, to 50 degrees C. above) the melting point of the polycrystalline fluoride material. A flow of hydrogen fluoride (for example, at 3 to 8 grams per hour) is then combined with the helium flow through inlet 24 in order to act as a scavenger of any water vapor or oxygen which may be present in the helium or outgassing of the furnace as the temperature is increased and of any oxides of oxyfluorides which may be present within the mixture of rare earth fluorides or alkaline earth rare earth fluorides.

The temperature of the furnace is further increased (for example, to 75 degrees C.) above the melting point of the mixture to lower the viscosity of the melt, to provide for complete mixing of the fluorides, and to remove bubbles therefrom.

After a sufficinet time interval has passed during which the crucible remains stationary, the crucible is then slowly lowered through the furnace and the gradient at a rate commensurate with the rate of growth of the particular crystal. Drop rates of 2 to 12 mm./hour are satisftctory depending on the material to be grown, the type of crucible used, and the size of the crystal. At the end of the growth region, which occurs at some point of lower temperature portion 32, the crystal is annealed at approximately 1200 degrees C. to 1300 degrees C., the time required therefor being dependent upon the material, the construction of the crucible, and the dimensions of the crystal. The crystals are then slowly and partially cooled to approximately 1000 degrees C., the hydrogen fluoride flow is halted and the furnace is cooled to room temperature over a period of twenty-four hours. The crystals are then removed from the crucible and ground into laser rods.

As a specific example, a fluorescent crystalline compound was synthesized from 0.128 moles $CaF_2$, 0.257 moles $ErF_3$, 0.0321 mole $TmF_3$, and 0.0321 moles $HoF_3$ and involved the use of a furnace specifically designed to contain a hydrogen fluoride atmosphere such as that depicted in FIG. 1. The graphite heating element provided a temperature gradient in the growth travel region of 50 degrees C./in.

The sintered starting material in the above amounts was first fused at the melting point in either a cylindrcal ultrapure graphite crucible or a vitreous carbon crucible in the presence of a small partial pressure of hydrogen fluoride in a helium atmosphere. This step eliminated slight traces of rare earth oxyfluoride (REOF) which may have remained from the sintering step. The oxyfluoride was eliminated according to the following reaction:

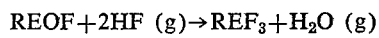

$$REOF + 2HF\ (g) \rightarrow REF_3 + H_2O\ (g)$$

The material obtained from the fusion process was then loaded into a graphite crucible. Preparatory to the growth process, the temperature was slowly increased to the melting point in a helium atmosphere, at which time a flow of hydrogen fluoride was started (5 to 8 g./hour). The temperature was further increased to 75 degrees C. above the melting point to lower the viscosity of the melt and, therefore, to provide complete mixing of dopant and host, and to remove bubbles.

Lowering rates of 2 to 12 mm./hour gave single crystal compound up to 2.5 inches long and ½ inch in diameter. When the crucible had traveled through the gradient, the lowering was halted and the crystal was annealed at 1200 to 1300 degrees C. The hydrogen fluoride flow was halted and the crystal was cooled to room temperature over a 24-hour period.

In the Czochralski process (see FIG. 2), a draw furnace 40 comprises a sealed enclosure 42, which is non-reactive to hydrogen fluoride, for enclosure of a crystal growing apparatus 44. Enclosure 42 is provided with a gas inlet 46 and an outlet 48 so that a dynamic atmosphere of hydrogen fluoride and helium may be provided within the enclosure.

Crystal growing apparatus 44 comprises a crucible 50 having an upstanding wall 52 to form a receptable 54 for reception of a mixture of crystal ingredients to be heated into a melt 56. A platform 58 supports the crucible. Crucible 50 is fabricated of a material which is nonreactive with the melt and hydrogen fluoride and may be made of a compacted graphite or vitreous carbon.

A rod 56 preferably of platnum extends from enclosure 42 through a sealed opening 60 for connection to a rotating and drawing mechanism. The rod may be supported by standards 62 and a plate 64 in any convenient manner.

A plurality of coils 66 are disposed about crucible 50 in order to heat the same and these coils may be designed to be operated by an RF source or by resistance heating. If the heating is by an RF means, crucible 50 must be made of or surrounded by a material which is a suitable RF susceptor in order to be heated by the RF coils. If the heating means comprises a resistance source, then any suitable nonreactive crucible material may be utilized.

When an RF source is used, the source is enclosed within a jacket 68 in which water or other coolant 70 is placed in order to maintain enclosure 42 cool and sealed to maintain the desired atmosphere in the furnace.

The furance is provide with a temperature profile 72 having an isothermal portion 74 and a decreasing temperature gradient 76. A point 78 on gradient 76 is the point at which melt 56 becomes a solid, this point designating the solid-liquid interface between the melt and the crystal. Point 78 of temperature profile 72 is controlled as to be located at approximately the surface of melt 56 or slightly thereabove so that a crystal 80 may be drawn from melt 26.

In operation, 99.999% pure rare earth and alkaline earth fluoride constituents of the crystal to be made are mixed and placed in crucible 50. Rod 56 is positioned just above the constituents and enclosure 42 of furnace 40 is sealed. A flow of hydrogen fluoride and helium is commenced at a slow rate, for example, of a few tenths of a gram per hour. The furnace temperature is raised to a level above the temperature at which a melt would form and permitted to remain at this level for a time (e.g. about seventeen hours) sufficient for a melt to form and become homogeneous and to remove bubbles therefrom.

The tip of rod 56 is then lowered into the melt and rotated at about four revolutions per hour. The furnace temperature is slowly decreased until spontaneous nucleation is observed to occur on rod 56. The rod is then raised at a steady state rate sufficient to obtain a uniform crystal diameter. Such a rate, at which steady state conditions occur between crystal growth and uniform diameter of the crystal, is approximately one-eighth to one-half inch per hour. After the desired length of crystal is formed, the rate at which the rod is raised is increased so that the crystal will taper off and pull away from the melt. Rod raising is stopped and the furnace temperature is permitted to drop to room temperature.

Laser quality crystals such as that described above in the example were obtained by this Czochralski method. Experiments followed by chemical and X-ray analysis of the crystals conclusively established compound formation at $Ca_2Er_5F_{19}$ ($2CaF_2:5ErF_3$). Melt compositions were prepared at Er/Ca ratios different from 5/2 (e.g., 4/1 and 3/1), and the resultant drawn crystals over their entire length were always hexagonal in structure and had the stoichiometric formula $Ca_2Fr_5F_{19}$.

The crystal synthesized by any of the above processes was cut into a rectangular solid three by three millimeters and 1.5 millimeters thick. The cut crystal was mounted in a copper block in contact with liquid nitrogen in a cylindrical quartz dewar. The fluorescence excitation was obtained by use of an argon laser of 40 microsecond pulse length, 10 pulses per second, and 1.5 millimeter beam diameter at the crystal. To obtain a standard of comparison, the crystal was excited at 5145 A. A peak laser power of 0.33 w. was obtained through a 5145 A. passing interference filter. A calibrated circular receive thermopile was used as a photometric standard. Fluorescence was detected with a 77° K. indium antimonide cell located 25 millimeters from the center of the crystal in the plane perpendicular to the dewar cylindrical axis. Fluorescence of trivalent holmium occurred at its 2 μm. transition with accompanying spectrum. The results of 2 μm. fluororescence excitation spectrum with respect to the 5145 A. excitation of trivalent erbium are depicted in FIGS. 3A and 3B.

FIG. 3A represents the energy levels of trivalent holmium, erbium, and thulium in terms of $10^3$ cm.$^{-1}$ and FIG. 3B depicts the fluorescence sensitization at 77° K. of the combination of trivalent rare earth ions on the same energy level scale. In FIG. 3A, all of the energy levels of the three trivalent rare earth ions in calcium fluoride are placed to the right while the individual levels of the ions are shown above their chemical symbols as letters. Thus, for example, the Y level $Ho^{3+}$ at approximately $5 \times 10^3$ cm.$^{-1}$ is depicted by the bar directly to its right, the A level of erbium at approximately $10 \times 10^3$ cm.$^{-1}$ by the bar directly to its right, and the $^3F_2$ level of thulium at approximately $14.5 \times 10^3$ cm.$^{-1}$ as a bar directly to its right. Excitation at the 5145 A. argon laser wave length was 94% of the peak excitation of the $F(Er^{3+})$ level at 5113 A. Fluorescence excitation efficiency at other wave lengths is referenced to the excitation monochromator transmission and to unity efficiency of $F(Er^{3+})$ at 5113 A. In FIG. 3B, the peak fluorescence power (radiative flux) efficiencies of the excitation levels are shown by thick lines 88, line 90 being unity efficiency. The apparent quantum yields are shown by thin lines 92, the scale from 0–6 identified by indicia 94 being a measurement of the ratio of the fluorescent wave length to the excitation wave length, multiplied by the peak power efficiency.

In a prior art dilute crystal as contrasted with the crystal of the present invention, fluorescent emission is obtained by pumping the crystal with light, for example with reference to FIG. 3A, in the energy region of $26–28 \times 10^3$ cm.$^{-1}$ representing the collection of energy levels of trivalent holmium, erbium, and thulium represented by letters K, L, M, N, O, and $^1D_2$, from which collection of energy levels a serial process of transitions by relaxation would occur, such as by a cross-relaxation process, down to the Y level of holmium at $5 \times 10^3$ cm.$^{-1}$, at which point a laser transition occurs down to the Z level.

In the present invention, on the other hand, as shown in FIGS. 3A and 3B, evidence of ion-pair absorption, i.e., an absorption by the combination of two or more rare earth ions, is shown in the fluorescence excitation spectrum at $11.8 \times 10^3$ cm.$^{-1}$ and $17.6 \times 10^3$ cm.$^{-1}$ corresponding to the energies $Y(Ho^{3+}) + Y(Er^{3+})$ and $$Y(Ho^{3+}) + B(Er^{3+}),$$

respectively. In the first case, the Y level of trivalent holmium is approximately $5 \times 10^3$ cm.$^{-1}$ and the Y level of trivalent erbium at approximately $6.8 \times 10^3$ cm.$^{-1}$, which when combined give $11.8 \times 10^3$ cm.$^{-1}$, as indicated in FIG. 3B by fluorescent excitation line 96. In the latter case, the Y level of trivalent holmium at approximately $5 \times 10^3$ cm.$^{-1}$ and the B level of trivalent erbium at approximately $12.6 \times 10^3$ cm.$^{-1}$ combine to provide an energy level at $17.6 \times 10^3$ cm.$^{-1}$, as shown in FIG. 3B by fluorescence excitation line 98. It is to be noted that, in the latter case, there are no energy levels of holmium, erbium or thulium which exist at this level, thereby illustrating the ion-pair absorption among the levels of two or more ions. By means of the bulb effect of such ion-pair transitions and the resulting increased spectral density of electronic excitation states in the crystal, the quantum yields were very much increased, up to 540% at the energy level of approximately $26.8 \times 10^3$ cm.$^{-1}$, as depicted in FIG. 3B by fluorescence excitation line 100.

As shown in FIG. 3B, energy conserving sensitization occurred for the trivalent erbium levels B, F, and L at approximately $12.4 \times 10^3$ cm.$^{-1}$, $19.8 \times 10^3$ cm.$^{-1}$, and $27.8 \times 10^3$ cm.$^{-1}$, respectively. Efficient sensitization is believed to result from a non-resonant process of excitation transfer in a multi-ion interaction in which as many as $10^4$ rare earth ions partition the excited state energy of a single ion. The absence of this effect in dilute crystals indicates that the high ion concentrations characteristic of $Ca_2Er_5F_{19}$ are necessary for observation of the effect. Furthermore, the energy conserving fluorescence excitation levels therefore are dependent on ion concentrations, although different ion relative concentrations may result in efficient levels other than those shown in FIG. 3B. Consequently, for laser applications of these crystals the relative ion concentrations may be chosen so as to provide a spectral distribution of excitation levels which will most efficiently capture the spectral energy of a given laser pump lamp.

The monocrystal phase of $Ca_2Er_5F_{19}$ is hexagonal and uniaxial birefringent. The birefringeral polarization selection rules are advantageous in laser applications of the material because different laser gains are possible by choice of laser rod axis relative to crystal axes. Also, laser resonator mode stabilization polarization can be selected by the same means.

Although the invention has been described with reference to particular embodiments thereof, it should be realized that various changes and modifications may be made therein without departing from the spirit and scope of the invention.

What is claimed is:

1. A laser crystalline composition of matter consisting of $$Ca_2Er_aHo_bTm_cYb_dF_{19}$$

wherein
$a \approx 5.0 - (b+c+d)$;
$b$ ranges from 0.05 to 0.50;
$c$ ranges from 0.05 to 0.50;
$d$ ranges from 0.0 to 0.50.

2. A laser crystalline composition of matter consisting of $$Ca_2Er_{4.0}Ho_{0.5}Tm_{0.5}F_{19}$$

3. A laser crystalline composition of matter consisting of $$Ca_2Er_{4.90}Ho_{0.05}Tm_{0.05}F_{19}$$

References Cited

UNITED STATES PATENTS 3,533,956 10/1970 Snitzer _____ 252—301.4 R
3,649,552 3/1972 Robinson et al. __ 252—301.4 H EDWARD J. MEROS, Primary Examiner J. COOPER, Assistant Examiner